Dec. 29, 1931.    J. T. WORTHINGTON    1,838,978
COMBINATION CONCENTRATED FIELD CIRCULATING TREATER
Original Filed Dec. 27, 1927
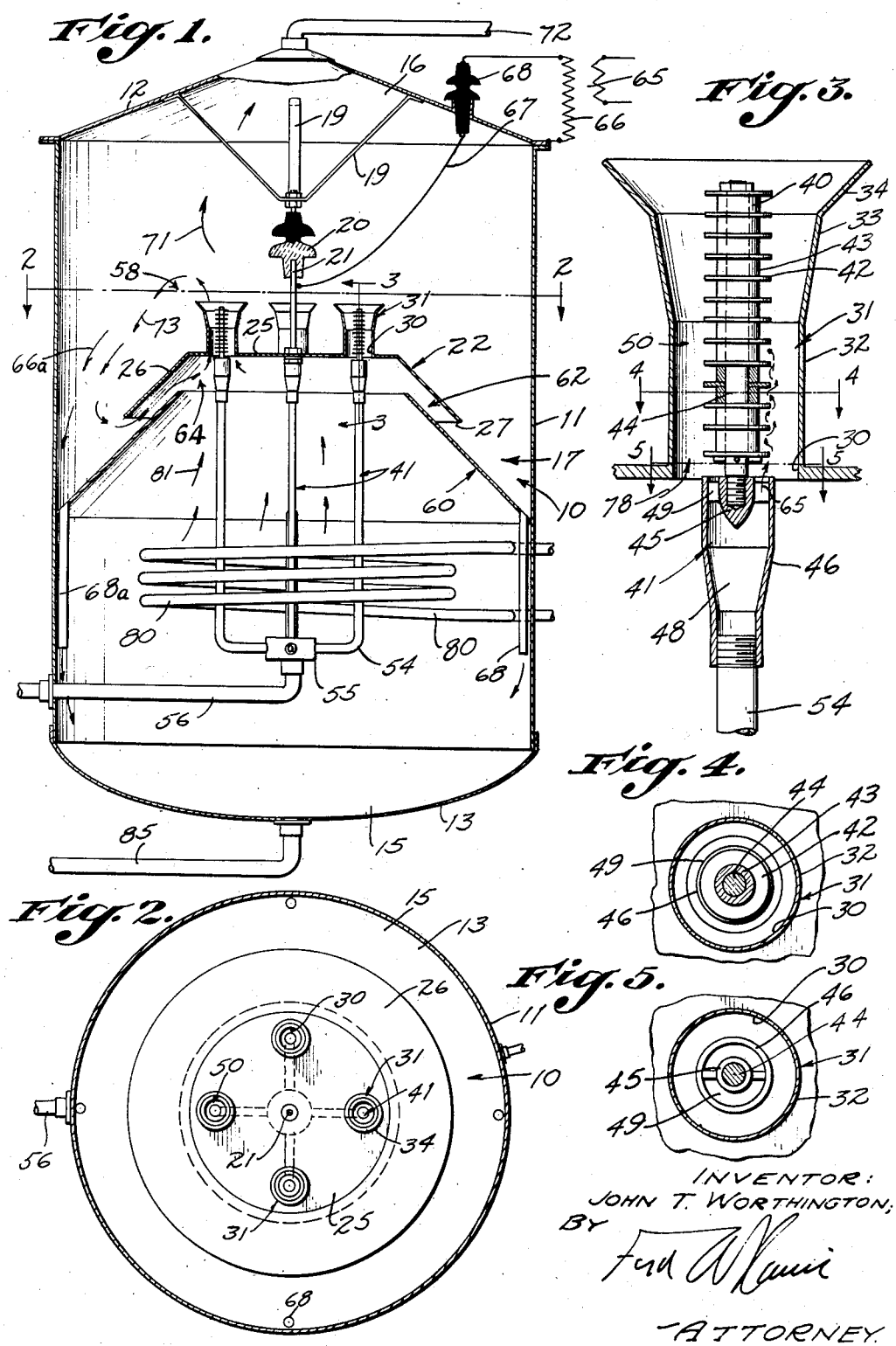
INVENTOR:
JOHN T. WORTHINGTON,
BY
ATTORNEY Patented Dec. 29, 1931

1,838,978

UNITED STATES PATENT OFFICE

JOHN T. WORTHINGTON, OF LONG BEACH, CALIFORNIA, ASSIGNOR TO PETROLEUM RECTIFYING COMPANY OF CALIFORNIA, OF LOS ANGELES, CALIFORNIA, A CORPORATION OF CALIFORNIA

COMBINATION CONCENTRATED FIELD CIRCULATING TREATER

Application filed December 27, 1927, Serial No. 242,562. Renewed November 18, 1930.

My invention relates to electric treaters, and more particularly to a device for treating a fluid to separate certain undesirable constituents therefrom.

My invention finds a particular utility in the petroleum industry and it is in this capacity that I shall particularly describe it without in any way limiting myself thereto.

In the petroleum industry, crude oil as it comes from the well is often intermixed with a certain amount of water. If this water content exceeds a very small percentage, the oil is ordinarily useless until the water is removed. This water is usually intermixed with the oil to form a finely divided emulsion, such an emulsion being very difficult to break through mechanical means. It is well-known that by passing such an emulsion through an electric field, the particles of water may be coalesced into large enough particles so that they will gravitate from the oil.

In certain treaters, a short concentrated electric field has been used to break these emulsions, but in handling some types of oil the emulsion is not entirely broken during the passage through this field, and there is a decided tendency for the heavier portions of the unbroken emulsion to separate out of the oil and be removed with the water. To correct this difficulty, I provide a secondary field, this field being so placed as to act upon any unbroken portion of the emulsion after treatment in a primary field.

It is an object of my invention to provide an electric treater adapted to separate an undesirable product from a fluid, this fluid being passed through a primary electric field, and any unseparated fluid being thereafter passed through a secondary field.

I have found that if the field intensity of the primary field is larger than that of the secondary field, the treatment is very effective, especially if a continuous circulation path for the fluid is established between the two fields.

It is an object of my invention to provide an electric treater having a primary and a secondary electric field therein, these fields being of different intensities.

Another object is to provide an electric treater having a continuous fluid path through two electric fields of different intensities, the fluid automatically traversing this path until all of the undesirable constituent has been removed.

Still a further object of my invention is to provide a novel form of electric treater in which any short-circuiting of the electrodes is eliminated.

Further objects and advantages of my invention will be made evident hereinafter.

A preferred embodiment of my invention is illustrated in the drawings, in which—

Fig. 1 is a vertical cross-sectional view of the treater of my invention.

Fig. 2 is a horizontal sectional view taken on the line 2—2 of Fig. 1.

Fig. 3 is an enlarged sectional view of a pair of electrodes of my invention.

Fig. 4 is a cross-section taken on the line 4—4 of Fig. 3.

Fig. 5 is a cross-section taken on the line 5—5 of Fig. 3.

Referring particularly to Fig. 1, the treater 10 of my invention has a shell 11 closed at its upper end by a dome 12 and at its lower end by a bottom plate 13. The extreme lower end of the treater 10 comprises a settling chamber 15, while the extreme upper end of the treater comprises an oil chamber 16, there being a treating chamber 17 intermediate the chambers 15 and 16.

Extending downward from the dome 12 is a bracket 19 which suitably supports an insulator 20. Extending downward from the insulator 20 is a rod 21 of a primary electrode 22 of my invention, this primary electrode being supported by the insulator 20 and the rod 21. The primary electrode 22 comprises a flat portion 25 which is preferably perpendicular to the rod 21. Extending downward from the outer edges of the flat portion 25 is a baffle in the form of an angled portion 26, this angled portion extending downward and outward and terminating in an outer edge 27. As best shown in Figs. 1 and 2, the fluid plate 25 has four openings 30 therein, and extending upward around each of these openings is a chimney portion 31. This chimney has a cylindrical member 32, the upper end of which is flared outward to form an intermediate portion 33 and an upper portion 34. It will be noted from Fig. 3 that the diameter of the chimney 31 increases toward its upper end.

Adapted to extend through each chimney portion 31 is an upper end 40 of a secondary electrode 41 of my invention. The upper end 40 comprises an alternate series of discs 42 held apart by suitable spacers 43, these discs and spacers surrounding a pin 44 which is threaded in a boss 45 of a supporting socket 46. The discs 42 and the spacers 43 are preferably formed of a hygroscopic material so that the emulsion will cling to the outer surfaces thereof. Each supporting socket 46 has a chamber 48, this chamber 48 being in communication, through channels 49, with a primary treating space 50 defined between the upper end 40 of the secondary electrode 41 and the chimney portion 31. Each chamber 48 is in communication with the interior of a supporting pipe 54 which is threadedly received by the socket 46. The lower ends of the supporting pipes 54 are joined together in a hub 55 and are in communication with a chamber in the interior thereof. Also communicating with this interior chamber is a fluid-supply pipe 56, this pipe extending outward through the shell 11 and suitably supporting the pipes 54, the sockets 46, and the upper ends 40 of the secondary electrode 41. Fluid entering the pipe 56 is equally divided between the supporting pipes 54, passing upward therein to the chambers 48 from whence it is discharged through the openings 49 into the primary treating space 50, this fluid being discharged into a primary separating zone 58 above and around the chimneys 31.

Extending inward and upward from the shell 11 is a tertiary electrode 60 of my invention, this electrode extending underneath the angled portion 26 of the primary electrode 22, there being a secondary treating space 62 formed between the angled portion 26 and the tertiary electrode 60. This treating space discharges into a secondary separating zone 64 and is inclined toward the primary treating space so as to direct the fluid passing therethrough into the separating zone 64 and toward the intake end of the primary treating space 50. A transformer 65 is adapted to set up electric fields in the primary and secondary treating spaces 50 and 62. This transformer has a secondary 66, one side of which is grounded to the tank 11. The other side of the secondary 66 is connected by a wire 67 to the rod 21 of the primary electrode 22, this wire 67 extending through a suitable insulator 68 secured in the dome 12.

In operating my invention, the transformer 65 is first energized. This sets up primary and secondary fields in the primary and secondary treating spaces 50 and 62 respectively. The primary field will be of greater intensity than the secondary field because of the fact that the distance between the secondary and primary electrodes is smaller than the distance between the tertiary and the primary electrodes. It is preferable that the shell 11 be filled with a dry oil before any emulsion or other fluid to be treated is supplied through the pipe 56. In the event that emulsion is being treated, this emulsion passes through the openings 49 in the supporting sockets 46, as indicated by the arrows 65 of Fig. 3. This wet oil moves along the periphery of the upper member 40 of the secondary electrode and is acted upon by the electric field in the primary treating space 50. Inasmuch as a film of dry oil lies just inside the chimney portion 31, no short-circuiting will occur between the upper member 40 and the chimney 31.

As the emulsion passes through the high intensity field in the primary treating space 50, a portion of this emulsion is broken and some of the water particles are coalesced into droplets of sufficient size that they will readily gravitate from the dry oil in a primary settling zone 58. This water follows the path indicated by the arrows 66a of Fig. 1 to the lower end of the V-shaped channel formed between the tertiary electrode 60 and the shell 11, from which it is conducted into the settling chamber 15 through suitable pipes 68a communicating with the space above the tertiary electrode 60. The dry oil follows a path indicated by the arrows 71 of Fig. 1, this dry oil rising into the oil chamber 16 and being carried therefrom through a suitable pipe 72.

Some types of emulsion are not completely broken when passing through the high intensity field in the primary treating space 50. In these emulsions there is a tendency for the heavier portions of the unbroken emulsion to separate from the oil rising in the direction of the arrow 71, this heavier portion of the unbroken emulsion following a path indicated by the arrows 73 of Fig. 1. It will be noted that the path of these unbroken particles is substantially the same as the path of the water particles which have been sufficiently coalesced until the lower edge 27 of the angled portion 26 is reached. Here, this unbroken emulsion is drawn through the low intensity electric field in the secondary treating space 62 in a path indicated by the arrows. As this unbroken emulsion is passed through the secondary treating space 62 it is acted upon by a lower intensity field than that established in the primary treating space 50, this lower intensity field being very effective in further separation of the oil and water particles when these particles reach the secondary separating zone 64. This movement through the secondary treating space 62 is caused primarily by the jet action of the fluid entering the primary treating chamber 50, this fluid tending to draw any fluid adjacent the supporting sockets 46 into the primary treating space in a direction indicated by the arrow 78 of Fig. 3. The passage of the unbroken emulsion through the secondary treating space 62 is also aided by a heating coil 80 mounted in the shell 11, this heating coil causing a rise of oil in the treating chamber 17 as indicated by arrows 81 of Fig. 1. Inasmuch as the emulsion passing through the secondary treating space 62 had a portion of the water content removed therefrom, this emulsion will act as a dielectric barrier in place of the dry oil originally lying in the outer portion of the primary treating chamber 50, so that short-circuiting paths across this treating chamber will not be formed and the electrodes will not be short-circuited.

The unbroken emulsion rising in the direction of the arrow 78 of Fig. 3 passes through the primary treating chamber 50 and is subjected to a further dehydrating action so that when it issues from the top of the chimney portion 31 it is substantially completely broken. Any unbroken emulsion will be subjected to the same action heretofore described, being drawn in the direction of the arrow 73 and through the secondary treating chamber 62.

It should thus be apparent that a continuous circulation path is set up in the treater of my invention and that any unbroken emulsion is continuously passed through the primary and secondary treating chambers 50 and 62 until the emulsion is entirely broken. It should be understood any suitable circulation means may be employed in place of the steam coil. In the meantime any water that separates out is allowed to pass through the pipe 68a into the settling chamber from whence it may be withdrawn through a suitable pipe 85, and any dry oil rises into the oil chamber 16 and is carried therefrom through the pipe 72.

The present invention is an improvement over the dehydrating apparatus shown and disclosed in the copending applications of Harmon F. Fisher, Serial No. 135,804, and Serial No. 203,253, which include claims directed to central and surrounding electrodes in combination with the fluid-introduction system herein disclosed. So also the present invention is an improvement on the apparatus disclosed in the copending application of Harmon F. Fisher, Serial No. 286,660.

I claim as my invention:

1. In an electric treater, the combination of: a shell; a primary electrode mounted in said shell, said primary electrode having a flat portion and an angled portion; a chimney on said flat portion; a secondary electrode extending into said chimney, said electrode being adapted to supply a fluid to be treated to a primary treating space between said secondary electrode and said chimney; a tertiary electrode mounted adjacent said angled portion, there being a secondary treating space between said tertiary electrode and said angled portion, said secondary treating space being adapted to receive a portion of said fluid after said fluid has passed through said primary treating space; and means for establishing primary and secondary electric fields in said primary and said secondary treating spaces.

2. A combination as defined in claim 1 in which said primary electric field is of a greater intensity than said secondary electric field.

3. A combination as defined in claim 1 including means for setting up a circulation path through said primary and said secondary treating spaces.

4. A combination as defined in claim 1 including means for heating said fluid to set up a circulation path through said primary and said secondary treating spaces.

5. In an electric treater, the combination of: a tank defining a settling zone; a plurality of pairs of electrodes defining primary treating spaces all communicating with said separating zone; a pair of electrodes defining a secondary treating space intaking from a portion of said separating zone and discharging in a direction toward the intake end of said primary treating spaces; and means for setting up electric fields in said primary and secondary treating spaces.

6. In an electric treater, the combination of: a tank defining a settling zone in the upper end thereof; a plurality of pairs of electrodes defining primary treating spaces opening on a separating zone at a primary level; means for introducing the fluid to be treated into said primary treating spaces in an upward direction, the lighter constituent of said fluid rising in said separating zone and the still unseparated portion of said fluid dropping to a secondary level below said primary level; and a pair of electrodes defining a secondary treating space at said secondary level and into which said still unseparated portion of said fluid passes.

7. A combination as defined in claim 6 in which said secondary treating space opens on a secondary separating zone at a tertiary level which lies adjacent the point of introduction of said fluid into said primary treating spaces, all of said primary treating spaces communicating with said secondary separating zone.

8. In an electric treater, the combination of: a pipe; a supporting socket secured to said pipe and having a chamber in communication with the interior of said pipe; a boss supported in one end of said chamber; a pin secured in said socket; a surrounding electrode around said pin; and means for supplying fluid under pressure to said pipe, said fluid discharging from said chamber around said pin and inside said surrounding electrode.

9. In an electric treater, the combination of: a primary electrode in the shape of an inverted cup and having a flat portion and an angled portion, said flat portion having one or more openings therein; a secondary electrode extending adjacent each opening and cooperating therewith in providing an annular treating space; means for introducing a fluid to be treated into said annular treating space; means for establishing an electric field in said annular treating space; and a tertiary electrode extending adjacent said angled portion and providing a secondary treating space through which any untreated portion of said fluid may flow.

In testimony whereof, I have hereunto set my hand at Los Angeles, California, this 22nd day of December, 1927.

JOHN T. WORTHINGTON.